United States Patent
Lewis et al.

(10) Patent No.: US 12,404,211 B2
(45) Date of Patent: Sep. 2, 2025

(54) USE OF GRAPHENE TO ENHANCE STABILITY AND DENSITY CONTROL OF CEMENT SLURRIES

(71) Applicant: Halliburton Energy Services, Inc., Houston, TX (US)

(72) Inventors: Samuel J. Lewis, Houston, TX (US); Thomas Jason Pisklak, Houston, TX (US); Claudia Pineda, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 18/677,530

(22) Filed: May 29, 2024

(65) Prior Publication Data

US 2024/0308907 A1 Sep. 19, 2024

Related U.S. Application Data

(62) Division of application No. 17/892,790, filed on Aug. 22, 2022, now Pat. No. 12,065,377.

(51) Int. Cl.
*C04B 14/02* (2006.01)
*C04B 28/04* (2006.01)
(Continued)

(52) U.S. Cl.
CPC .......... *C04B 14/022* (2013.01); *C04B 28/04* (2013.01); *C04B 40/0046* (2013.01);
(Continued)

(58) Field of Classification Search
CPC ... C04B 14/022; C04B 28/04; C04B 40/0046; C04B 2201/20; C09K 8/467; E21B 33/13
See application file for complete search history.

(56) References Cited

U.S. PATENT DOCUMENTS

| 11,739,247 B1 | 8/2023 | Boul |
| 11,981,858 B2 | 5/2024 | Pisklak |

(Continued)

FOREIGN PATENT DOCUMENTS

| CN | 111116081 | 5/2020 | |
| WO | 2015084438 A1 | 6/2015 | |
| WO | WO-2021076667 A1 * | 4/2021 | ........... C04B 14/026 |
| WO | 2023168263 A1 | 9/2023 | |

OTHER PUBLICATIONS

Alkhamis, M. et al., "New Cement Formulations Utilizing Graphene Nano Platelets to Improve CementProperties and Long-Term Reliability in Oil Wells", SPE Kingdom of Saudi Technical Symposium and Exhibition, 2018, SPE-192342-MS, pp. 1-17.

(Continued)

*Primary Examiner* — Crystal J Lee
(74) *Attorney, Agent, or Firm* — Conley Rose, P.C.; Rodney B. Carroll

(57) ABSTRACT

A cement slurry including graphene, a cementitious material, and water; the graphene comprises bioderived renewable graphene (BRG). The cement slurry can comprise from about 0.01 to about 20, from about 0.1 to about 15, from about 0.5 to about 5 percent graphene by weight of cementitious material (% graphene bwoc). The cement slurry can have enhanced stability, as evidenced by a uniform density of the slurry and a reduction in free fluid, according to API 10B-2, relative to a same cement slurry absent the graphene.

20 Claims, 2 Drawing Sheets

(51) Int. Cl.
*C04B 40/00* (2006.01)
*C09K 8/467* (2006.01)
*E21B 33/13* (2006.01)

(52) U.S. Cl.
CPC ............. *C09K 8/467* (2013.01); *E21B 33/13* (2013.01); *C04B 2201/20* (2013.01)

(56) References Cited

U.S. PATENT DOCUMENTS

| | | |
|---|---|---|
| 12,018,207 B2 | 6/2024 | Pisklak |
| 12,065,377 B2 | 8/2024 | Lewis |
| 2012/0015852 A1 | 1/2012 | Quintero |
| 2012/0245058 A1 | 9/2012 | Monteiro |
| 2013/0341028 A1 | 12/2013 | Christian |
| 2014/0134092 A1* | 5/2014 | Shankman ............ B82Y 30/00 423/448 |
| 2015/0108391 A1 | 4/2015 | Tour |
| 2015/0152314 A1* | 6/2015 | Muthusamy ............ C04B 28/02 106/781 |
| 2015/0275067 A1 | 10/2015 | Kabbani |
| 2017/0327729 A1 | 11/2017 | Salla |
| 2018/0282214 A1 | 10/2018 | Xiang |
| 2019/0144280 A1* | 5/2019 | Opoku .................. C01B 32/15 423/461 |
| 2020/0056086 A1 | 2/2020 | Haq |
| 2020/0308469 A1 | 10/2020 | Taleghani |
| 2021/0061661 A1 | 3/2021 | Opoku |
| 2021/0238040 A1 | 8/2021 | Opoku |
| 2022/0234955 A1 | 7/2022 | Masotti |
| 2024/0059608 A1 | 2/2024 | Lewis et al. |
| 2024/0059952 A1 | 2/2024 | Pisklak et al. |
| 2024/0059953 A1 | 2/2024 | Pisklak et al. |
| 2024/0059955 A1 | 2/2024 | Pisklak et al. |
| 2024/0247178 A1 | 7/2024 | Pisklak et al. |

OTHER PUBLICATIONS

Zhi Ge et al., "The Effect of the Addition of Graphene Nano platelets on the Selected Properties of Cementitious Composites", Frontiers in Built Environment, pp. 1-10 2021, vol. 7, Article No. 673346.

Filing Receipt, Specification and Drawings for U.S. Appl. No. 17/892,781, filed Aug. 22, 2022, entitled "Use of Graphene as a Cement Retarder," 43 pages.

Filing Receipt, Specification and Drawings for U.S. Appl. No. 18/367,145, filed Sep. 21, 2023, entitled "Bioderived Renewable Graphene Enhanced Cement," 46 pages. (4727-53900).

Filing Receipt, Specification and Drawings for U.S. Appl. No. 18/627,715, filed Apr. 5, 2024, entitled "Graphene Fluid Utilized To Suspend Particulates," 45 pages. (4727-37902).

Rhee, I. et al., "Compressive Strength Sensitivity of Cement Mortar Using Rice Husk-Derived Graphene With a High Specific Surface Area", Construction and Building Materials, 2015, vol. 96, pp. 189-197.

First Office Action dated Mar. 23, 2023 (17 pages), U.S. Appl. No. 17/892,781, filed Aug. 22, 2022.

Foreign Communication from Related Application—International Search Report and Written Opinion of the International Searching Authority, International Application No. PCT/US2023/023473, dated Sep. 12, 2023, 10 pages.

Foreign Communication from Related Application—International Search Report and Written Opinion of the International Searching Authority, International Application No. PCT/US2023/023475, dated Sep. 12, 2023, 9 pages, abstract tables; 1, 2.

Foreign Communication from Related Application—International Search Report and Written Opinion of the International Searching Authority, International Application No. PCT/US2023/024519, dated Aug. 22, 2023, 9 pages.

Foreign Communication from Related Application—International Search Report and Written Opinion of the International Searching Authority, International Application No. PCT/US2023/024521, dated Sep. 19, 2023, 9 pages.

Ikram, Rabia et al., "Utilization of eco-friendly waste generated nanomaterials in water-based drilling fluids; state of the art review", Materials, Jul. 27, 2021 (Publication date), vol. 14, Article No. 4171, Internal pp. 1-28.

First Office Action dated Jul. 30, 2024 (23 pages), U.S. Appl. No. 18/367,145 filed Aug. 12, 2023.

Final Office Action dated Oct. 2, 2024 (15 pages), U.S. Appl. No. 18/367,145, filed Aug. 12, 2023.

\* cited by examiner

USE OF GRAPHENE TO ENHANCE STABILITY AND DENSITY CONTROL OF CEMENT SLURRIES

CROSS-REFERENCE TO RELATED APPLICATIONS

The present application is a divisional of and claims priority to U.S. patent application Ser. No. 17/892,790 filed Aug. 22, 2022, entitled "Use of Graphene to Enhance Stability and Density Control of Cement Slurries," which is hereby incorporated by reference in its entirety.

STATEMENT REGARDING FEDERALLY SPONSORED RESEARCH OR DEVELOPMENT

Not applicable.

TECHNICAL FIELD

The present disclosure relates generally to cement. More specifically, the present disclosure relates to enhanced stability and density control of cement slurries. Still more specifically, the present disclosure relates to the use of graphene in cement slurries to enhance stability and density control.

BACKGROUND

Cement is utilized in a number of applications, including oilwell and non-oilwell applications. During a cementing operation, it is important to have stability and density control of a cement slurry during placement thereof.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

As utilized herein, the phrase "percent by weight of water", abbreviated "% bwow", indicates the amount of additive material divided by the weight of water multiplied by 100 and the phrase, "percent by weight of the composition" or "percent by weight of cement", abbreviated "% bwoc", indicates the amount of additive material divided by the weight of cementitious material multiplied by 100.

As utilized herein, bioderived renewable graphene (BRG) is a biorenewable resource that can be renewed via biological means and produced by biological organisms.

Disclosed herein are systems and methods to address settling, particle stability, and the ability to alter density on the fly by adding water when making cement slurries. It has been unexpectedly discovered that the addition of graphene, for example in concentrations from about 1 to 15%, as described herein can be utilized to produce a highly thixotropic gel with a very fragile break.

Herein disclosed is the use of graphene as a water extender and/or suspension aid. The graphene can be utilized for slurries at high temperatures, in embodiments, due to the thermal resilience of graphene. In embodiments, the system and method also allow for dilution of a slurry (e.g., by nearly 400% by volume of water) while maintaining thixotropic behavior and flowability under dynamic conditions. As a secondary, synergistic effect, utilizing graphene as a suspending aid, as described herein, can provide for mechanical property enhancement of the resulting slurries (e.g., cements), due to mechanical property modification properties of graphene.

A unique usage of graphene material, as described herein, can also incorporate the properties, such as flexibility, electrical conductivity, etc., of the graphene The interesting thixotropic behavior of the resulting slurries can, in embodiments, enable a wide range water extendable cement allowing variable densities from a single design across a wide (e.g., about 5 or more) pounds per gallon (ppg) range.

Figure 2:
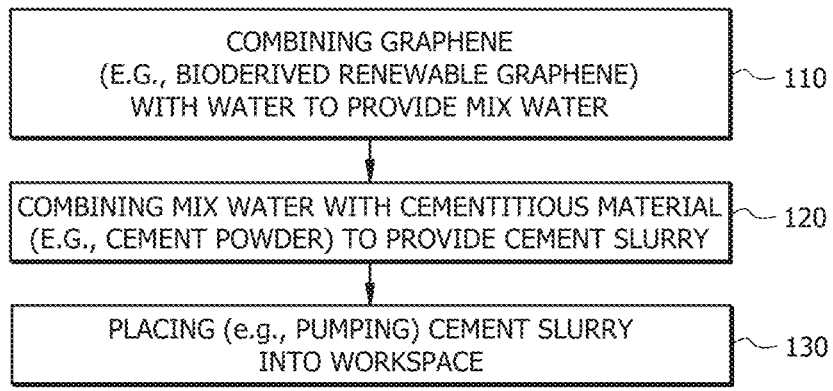
FIG. 2 is a schematic flow diagram of a method, according to embodiments of this disclosure.
Figure 3:
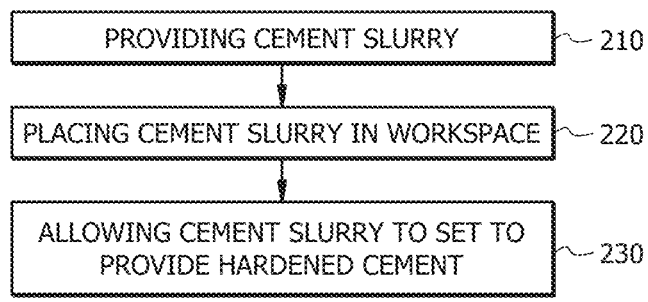
FIG. 3 is a schematic flow diagram of a method, according to embodiments of this disclosure.

Herein disclosed are cement slurries and methods of making and using same that provide for enhanced stability and density control. The cement slurry of this disclosure, and methods of making and using same, will now be described with reference to FIG. 1, which is a schematic of a cement slurry 50 (also referred to herein as a "cement composition" 50), according to embodiments of this disclosure; FIG. 2, which is a schematic flow diagram of a method 100 of making such a cement slurry 50 (and enhancing the stability and density control of the cement slurry 50), according to embodiments of this disclosure; and FIG. 3, which is a schematic flow diagram of a method 200 of using the cement slurry 50, according to embodiments of this disclosure. Reference to "cement slurry" can indicate an unset cement slurry that has not yet hardened to a hardened cement, such as a recently mixed cement slurry.

Figure 1:
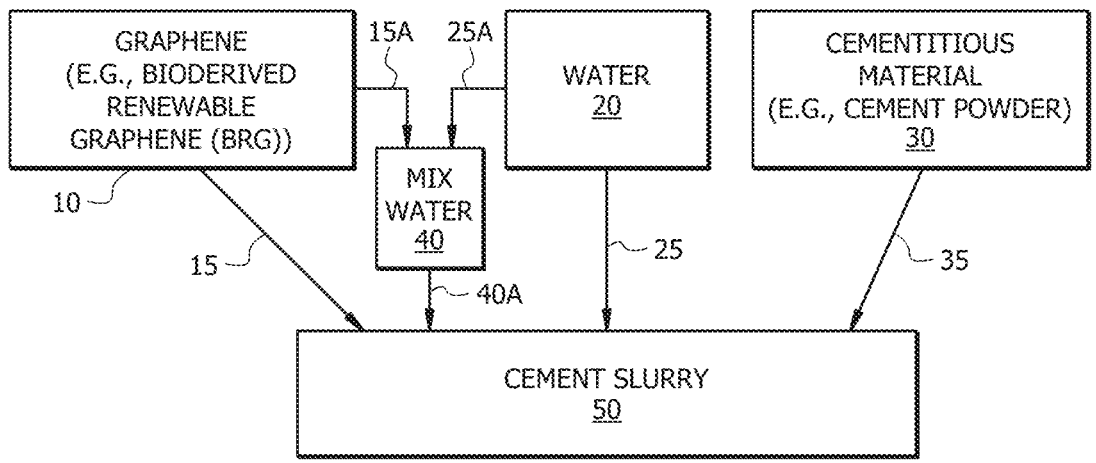
FIG. 1 is a schematic of a cement slurry, according to embodiments of this disclosure.

With reference to FIG. 1, a cement slurry 50 of this disclosure comprises graphene 10, water 20 (also referred to as "aqueous base fluid" 20), and a cementitious material 30 (e.g., a cement powder, also referred to herein simply as a "cement"). The cement slurry 50 has enhanced stability, as evidenced by a more uniform density of the cement slurry and/or a reduction in free fluid, as measured according to API 10B-2, relative to a same cement slurry absent the graphene. Cement slurry density is significant to wellbore hydrostatic pressure, for example, and large variations in cement slurry density can be undesirable, as such density variations may cause changes in other properties of the cement slurry.

Enhanced stability control can provide many advantages. For example, the enhanced stability provided by the herein disclosed cement slurries can serve to prevent settling and free water in the cement slurry; enable formation of a cement barrier that is homogenous and has designed properties (e.g., density, porosity, permeability, mechanical properties, etc.); enable formation of a stable slurry with reduced cost of goods sold (COGS), for example by eliminating a need for a suspension aid, while also resulting in enhanced mechanical properties (thus serving double duty); prevent or minimize the cost of poor quality (COPQ) due to reduced pump time from shut downs (e.g., the disclosed cement slurry may not settle when static); and/or a provide for a reduced need for suspending aids, such as bentonite, which can negatively contribute to mechanical property development of low-Portland cements. In some embodiments, the cement slurry may be free or substantially free of suspending aids.

According to embodiments of this disclosure, the graphene 10 can comprise bioderived renewable graphene (BRG). The cement slurry 50 can comprise from about 0.01 to about 20, from about 0.1 to about 15, from about 0.5 to about 5, or greater than or equal to about 0, 0.1, 0.5, 1, 2, 3, 4, 5, 6, 7, 8, 9, 10 or 15, and/or and less than or equal to about 20, 19, 18, 17, 16, 15, 10, or 5 percent graphene 10 (e.g., BRG) by weight of cementitious material 20 (% BRG bwoc).

In embodiments, the graphene 10 does not comprise or does not consist of a synthetic graphene. According to embodiments of this disclosure, the graphene 10 can comprise bioderived renewable graphene (BRG). In embodiments, the BRG comprises graphene 10 derived from a plant. In embodiments, the BRG comprises graphene 10 derived from a carbohydrate. For example, in embodiments, the carbohydrate comprises cassava (e.g., cassava root), corn (e.g., corn grain, corn flour), sugar cane (e.g., sucrose), and/or rice (e.g., rice grain), and the graphene 10 comprises graphene derived from cassava, corn, and/or rice. The BRG can comprise graphene with a fused sheet-like morphology (e.g., graphene nanosheets, referred to herein as "nanosheets"). Sheet-like indicates stratified, deposited, or arranged in horizontal layers. For example, such BRG derived from cassava and comprising graphene nanosheets is described in U.S. Patent Publication No. 2021/0061661, U.S. Patent Publication No. 2021/0238040, and U.S. Patent Publication No. 2019/0144280, the disclosure of each of which is hereby incorporated herein in its entirety for purposes not contrary to this disclosure. In embodiments, the graphene 10 comprises BRG such as described in the aforementioned patent applications and/or obtained from SurgePower Materials, Inc., New Braunfels, TX.

In embodiments, graphene 10 comprises a carbon nanosheet with distinct properties that can be produced from a renewable carbonaceous raw materials such as, without limitation, cassava root extract, corn flour, rice grain, wheat flour, yam root extract, potatoes root extract, sugar beet roots extract and sucrose (generally referred to herein as carbohydrates). The process for making carbon nanosheet from these carbohydrates can be as follows.

First, the aforementioned carbohydrate can be placed in a solvent, such as a solvent containing water or ethylene glycol or ethanol, to aid hydrolysis. This can be followed by gradual removing of glycosidic linkages in the carbohydrate via chemical and/or thermal activation. This pre-treatment step causes formation of intermediate fused carbon material, which contains limited amount of glycosidic bonds, hydroxyl and carbonyl groups. Chemicals that can be effective include, without limitation, sodium hydroxide, hydrochloric acid, phosphoric acid, phosphorous acid, and nitric acid. In addition, catalyst such as yeast, aluminum-nickel alloy, cobalt, $B_2H_6$, zinc, and copper can be employed.

The mixture of carbonaceous material and chemical and/or catalyst can be exposed to approximately 45 to 1050° C., in air or inert atmosphere to aid formation of a fused carbon network with a sheet-like morphology, referred to herein as an intermediate carbon material.

Another step can include thermochemical activation of the intermediate carbon based material to initiate chemical bonding of carbon atoms to form a hexagonal planar network of mainly sp2 hybridization carbons. This occurs by at least switching oxygen atom and releasing hydroxyl portion of said intermediate carbon material to result in a short range or long range of aromatic ring structure or a mixture of both within the sheet that is retained and other groups or molecules are released. This step can be performed at temperature in the range of 500 to 1500° C., in an inert gas containing hydrogen gas, in embodiments, and can result in a network of high surface area and pore volume sp2 bonded carbon nanosheet.

The resulting carbon nanosheet powders can be washed with up to 10 volume percent hydrochloric acid (HCl) to remove any remaining precursors and catalyst in the final product, and can be followed by heat treatment at 700 to 1500° C., for example in inert atmosphere.

Alternatively or additionally, the step of treating the intermediate carbon product to form mainly sp2 hybridization carbons can be accomplished via chemical process. Such process can include, without limitation, treating the intermediate carbon product with a chemical, such as a chemical chosen from the group of hydrazine, $LiAlH_4$, $B_2H_6$, and/or $NaBH_4$; in embodiments, hydrazine, and in other embodiments $NaBH_4$.

As mentioned above, the process of producing carbon nanosheets can begin with a renewable carbonaceous raw material, such as cassava root extract, corn flour, rice grain, wheat flour, or sucrose. These renewable carbonaceous materials contain a high content of carbohydrates on a water free basis, typically more than 70% by weight. The renewable carbonaceous material can contain various percentages of glucose, and fructose bonded together by glycosidic linkages to form polymeric units such as amylase and amylopectin. Although the molecular formula for glucose and fructose are the same, thus ($C_6H_{23}O_6$), they have different molecular structures.

In order to obtain a carbon nanosheet, each carbohydrate unit can be pre-treated with a dehydration solution, for example containing at least 1% of acid or catalyst. The pretreatment can result in an intermediate carbon material with dark-grey color made up of fused sheet-like morphology.

The mechanism can unfold in two stages. First, the treatment of the carbohydrate via chemical and/or thermal activation can result in hydrolysis and removal of the glycosidic linkages in the polymeric carbohydrate unit to form individual glucose and fructose units. This can be followed by a second mechanism to remove water molecules from each of glucose or fructose units by a dehydration solution. The pretreatment can be accomplished by gradual heating of the carbohydrate and hydration solution, for example at 45 to 1050° C., preferably 80° C., e.g., for up to 36 hours or more. In the process, the carbon atoms can rearrange to form a ring with neighboring carbon atoms. The hydration solution can cause intercalation of the layers of carbon after ring formation, thus giving rise to a layered structure.

The intermediate carbon product can undergo a second treatment to exfoliate the intercalated carbon layers. Several thermal and/or chemical methods can be used to exfoliate the carbon sheet. Thermal methods include direct heating of the intermediate carbon material. Radiant heating in a resistive furnace, or on top of a hotplate, laser irradiation and microwave irradiation can be effective for exfoliating carbon nanosheet and removal of water molecules to form mainly sp2 bonded carbon nanosheets.

Thermal exfoliation via microwave heating can remove substantial amount of $H_2O$ molecules from the intermediate carbon materials, with a reduction in oxygen content from the intermediate carbon materials, for example from 39.5 to 14.6 weight percent.

Exfoliated carbon nanosheets can be washed (e.g., with a 10 volume percent HCl) to remove remaining hydration solution and/or catalyst compounds. Subsequently, the resulting product can be washed with de-ionized water one or several times, for example until the pH is about 7. The resulting material can be thermally treated at high temperature in inert atmosphere to remove any groups attached to the nanosheet and terminate the ends with hydrogen. The carbon nanosheets can have a sheet-like morphology, and carbon composition can be up to 90, 91, 92, 93, or 94 weight percent or more.

In an alternate method of producing carbon nanosheets, the carbohydrate can be soaked in dehydration solution, as previously discussed. The mixture can be directly exposed to rapid and uniform high temperature heating immediately after thorough and uniform mixing. This can cause removal of glycosidic bonds and release of water molecules, thereby forcing the resulting intermediate carbon materials to exfoliate into carbon nanosheet. Specifically, heating can be accomplished by microwave irradiation and/or heating in an oven preheated, for example, to at least 500° C., to yield the carbon nanosheet.

In other embodiments, after thorough and uniform mixing of said carbohydrate and dehydration solution (e.g., containing excess deionized water), this mixture can be slowly heated to temperature below 100° C., and held there a time of, for example, less than 24 hours. The mixture can form a dark colored intermediate solution containing carbon. The dark intermediate solution can be coated on a substrate to form thin films. The resulting films can be exposed to high temperatures in inert atmosphere containing, for example, at least 2% by volume hydrogen gas. The films can be slowly heated, for example in the range of 700-1500° C., to form a thin layer of conducting carbon nanosheet on a substrate. The substrate can include, for example, copper foil, silicon wafer, glass slide or a quartz substrate.

In embodiments, a process for forming the nanosheets can comprise providing a renewable carbohydrate source to a reactor comprising a solvent to obtain a soaked or dissolved carbohydrate source; adding a dehydration solution and a catalyst to the reactor comprising the soaked or dissolved carbohydrate source to obtain a reaction mixture, e.g., where the dehydration solution has a hydrogen ions concentration of at least approximately 1%; charging said reactor with air or inert gas; heating the reaction mixture to remove glycosidic linkages and water molecules from the carbohydrate, thereby producing an intermediate mixture with sheet-like morphology; and further heating the intermediate mixture in inert gas to form the carbon nanosheet material. The carbon nanosheet material can be in the form of a powder. The carbohydrate source can comprise yam root extract, potato root extract, cassava root extract, cassava root flour, tapioca flour, dried cassava root pulp, dried and fried cassava root flakes, sugarcane extract, sugar beet root extract, sucrose, rice grain, corn, or wheat grain.

In embodiments, the solvent can be chosen from distilled water, deionized water, ethanol, and ethylene glycol. In embodiments, the dehydration solution can be chosen from sodium hydroxide, hydrochloric acid, phosphoric acid, phosphorous acid, and nitric acid. In embodiments, the process further comprises removing the dehydration solution by washing and diluting with excess distilled or deionized water prior to further heating of the intermediate mixture.

The catalyst can be chosen from platinum, palladium, $LiAlH_4$, nickel, yeast, aluminum-nickel alloy, cobalt, $B_2H_6$, zinc, $NaBH_4$, copper, or combinations thereof. The process can further include removing the catalyst by washing, filtering, magnetic separation, sonication, sieving, and/or centrifugation prior to further heating of the intermediate mixture.

The heating of the reaction mixture can be carried out in air or inert gas, for example at approximately 45 to 1050° C. The process can further include, prior to further heating the intermediate mixture, drying the intermediate mixture to produce an intermediate mixture in form of a powder; wherein the intermediate mixture in form of powder is heated in the inert gas, for example at approximately 500 to 1500° C., to produce the carbon nanosheet material. The inert gas can comprise, for example, argon, helium, or nitrogen, and can optionally further comprise a partial pressure of hydrogen gas. The intermediate mixture can be heated to a temperature of approximately 45 to 1050° C.

The carbon nanosheet material can have a specific surface area of at least 2000, 2100, 2200, 2300, 2400, or 2496 $m^2/g$ and/or a pore volume of at least 3.0, 3.1, 3.2, 3.3, 3.4, 3.5, or 3.6 cc/g. The carbon nanosheet material can have a pore volume of up to 3.0, 4.0, or 5.0 cc/g.

Cementitious material 30 can comprise a cement powder, such as, without limitation, a Portland cement. A variety of cementitious materials 30 can be used in the cement slurry 50, including cements comprised of calcium, aluminum, silicon, oxygen, and/or sulfur which set and harden by reaction with water. Such hydraulic cements include Portland cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. In embodiments, cementitious material 30 comprises a Type I, IA, II, IIA, III, IIIA, IV, V, VI, or VII Portland cement, or a combination or subtype thereof, such as, for example, a Type IL (e.g., limestone) cement powder, as defined in the ASTM standard (e.g., ASTM C150). In embodiments, cementitious material 30 comprises a non-API cement. In embodiments, cementitious material 30 comprises an API cement, such as, for example, an API Portland cement from one or more of Classes A, B, C, D, E, F, G, H, K and/or L, for example, from one of Classes A, C, H, and G.

In embodiments, cement 50 can comprise a construction grade cementitious material 30. According to this disclosure, a construction grade cement is a non-API cement, such as containing a cementitious material 30 comprising greater than about 1% by weight of calcium aluminate, C3A. In embodiments, the cementitious material 30 has an aluminate content (e.g., C3A) in a range of from about 1 to about 30, from about 3 to about 20, from about 5 to about 15, or greater than or equal to about 1, 3, or 5 percent aluminate by mass of cementitious material 30.

The cement slurry 50 of this disclosure can contain one or more additives. In embodiments, the additives comprise one or more selected from resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, cement kiln dust, gas migration control additives, formation conditioning agents, or combinations thereof.

Water 20 can comprise an aqueous base fluid. An aqueous base fluid 20 can be present in the cement slurry 50 in an amount sufficient to make a slurry which is pumpable for introduction to a desired location in a workspace, for example, down hole, in embodiments. In embodiments, the aqueous base fluid or water 30 comprises fresh water; brackish water; saltwater; or a combination thereof. In embodiments, the water 20 can be present in the cement slurry 50 in an amount of from about 20% to about 80% by weight of cementitious material 30 ("bwoc"), from about 28% to about 60% bwoc, or from about 36% to about 66% bwoc.

In embodiments, the cement slurry 50 can have a slurry density which is pumpable for introduction down hole. In embodiments, the density of the cement slurry 50 is from about 7 pounds per gallon (ppg) to about 20 ppg, from about 10 ppg to about 18 ppg, or from about 13 ppg to about 17 ppg.

A yield point of the cement slurry 50 as measured according to API 10B-2 (e.g., after two hours of quiescent aging at room temperature and pressure) can be reduced by at least 10, 20, 30, 40, or 50% relative to a same cement slurry absent the graphene 10. An apparent viscosity at 100 RPM ($AVIS_{100}$) of the cement slurry 50 as measured, for example, according to API 10B-2 (e.g., after two hours of quiescent aging at room temperature and pressure), can be reduced by at least 10, 20, 30, 40, or 50% relative to the same cement slurry absent the graphene 10. A thixotropic rate of the cement slurry 50, measured as the ten minute yield point (e.g., measured according to API 10B-2) divided by ten can be less than a thixotropic rate of the same cement slurry absent the graphene 10. In embodiments, the thixotropic rate of the cement slurry 50 can be reduced by at least 5, 10, 15, or 20% relative to the thixotropic rate of the same cement slurry absent the graphene 10.

Also provided herein is a method of enhancing stability and density control of cement slurries. The method will now be described with reference to FIG. 2, which is schematic flow diagram of a method 100, according to embodiments of this disclosure. Method 100 of making the cement slurry 50, whereby stability and density control of the cement slurry 50 are enhanced, comprises, combining the graphene 10 and cementitious material 30 with water 20 to provide the cement slurry 50. In embodiments, as depicted at 110, graphene 10 is combined with water 20 to provide a mix water 40, and, at 120, the mix water 40 is combined with the cement (e.g., cement powder) 30 to provide the cement slurry 50, wherein the cement slurry 50 has enhanced stability, as evidenced by a uniform density of the slurry and a reduction in free fluid, as measured according to API 10B-2, relative to a same cement slurry absent the graphene 10. Alternatively or additionally, graphene 10 can be otherwise incorporated into cement slurry 50. For example, in embodiments, graphene 10 can be dry blended into cement slurry 50. As depicted in FIG. 2, Method 100 can further include, at 130, placing (e.g., pumping) the cement slurry 50 into a workspace. The enhanced stability and density control of the cement slurry 50 of this disclosure can facilitate placing (e.g., pumping) of the cement slurry 50 into a workspace, in embodiments.

As depicted in FIG. 1, line 15, 25, and 35 can be utilized to graphene 10, water 20, and cementitious material 30, respectively. Alternatively or additionally, lines 15A and 25A can be utilized to combine graphene 10 with water 20 to provide mix water 40, and lines 40A and 35 can be utilized to combine the mix water 40 and cementitious material 30 to provide the cement slurry 50. The order of combination of the graphene 10, water 20, and cementitious material 30 can be adjusted, and remain within the scope of this disclosure.

The cement slurry 50 can be a cement slurry 50 as described hereinabove. For example, the cement slurry 50 can comprise from about 0.01 to about 20, from about 0.1 to about 15, from about 0.5 to about 5, or greater than or equal to about 0, 0.1, or 0.5 and less than or equal to about 20, 15, or 5 percent graphene (e.g., BRG) by weight of cementitious material 30 (% BRG bwoc).

As described hereinabove, the graphene 10 can comprise bioderived renewable graphene (BRG), such as, without limitation, BRG comprising graphene derived from a plant, such as the cassava plant. The BRG can comprise graphene with a fused sheet-like morphology (e.g., graphene nanosheets), such as the graphene 10 described in U.S. Patent Publication No. 2021/0061661, U.S. Patent Publication No. 2021/0238040, and/or U.S. Patent Publication No. 2019/0144280, incorporated hereinabove by reference. Without being limited by theory, BRG can provide enhanced results relative to non-bioderived graphene due to characteristics of the BRG provided by the production thereof.

The cementitious material 30 can comprise a Portland cement, such as, for example, a Type I, IA, II, IIA, III, IIIA, IV, V, VI, or VII Portland cement, a subtype thereof, or a combination thereof. In embodiments, the cementitious material 30 comprises a construction grade (e.g., non-API) cement, as described herein. The construction grade cement can be a cement comprising greater than about 1 weight percent (wt %) calcium aluminate (C3A). In embodiments, the cementitious material 30 comprises an API grade cement (e.g., API grade A, B, C, D, E, F, G, H, K, or L cement).

Also disclosed herein is a method of using the cement slurry 50 of this disclosure, for example, providing enhanced stability and density control of the cement slurry 50 relative to a same cement slurry absent the graphene 10. Such a method will now be described with reference to FIG. 3, which is a schematic flow diagram of a method 200, according to embodiments of this disclosure. Method 200 comprises: providing a cement slurry 50 of this disclosure at 210, placing the cement slurry 50 in a workspace at 220, and allowing the cement slurry 50 to set to provide a hardened cement (also referred to herein as a "set" cement) at 230. The cement slurry can be a cement slurry 50 as described hereinabove with reference to FIG. 1 and/or made as described hereinabove with reference to FIG. 2, wherein the cement slurry 50 comprises graphene 10 (e.g., BRG), water 20, and a cement (e.g., cementitious material) 30. The cement slurry 50 can provide enhanced stability and thus facilitated density control relative to a same cement slurry absent the graphene 10. For example, the cement slurry 50 can have enhanced stability, as evidenced by a uniform density of the slurry and a reduction in free fluid, as measured according to API 10B-2, relative to a same cement slurry absent the graphene 10.

The workspace can comprise an oilwell workspace, such as, for example and without limitation, a subterranean workspace, such as a wellbore. In embodiments, the workspace comprises a non-oilwell workspace, such as, for example and without limitation, a construction site, roadway repair, tunnel/mining, bridges, etc. The placing of the cement slurry 50 can be effected during a primary cementing operation, or another cementing application, in an oil and gas or non-oil and gas operation.

As detailed hereinabove, the graphene 10 can comprise bioderived renewable graphene (BRG), such as graphene 10 derived from a plant, such as, without limitation, the cassava plant. The BRG can comprise graphene nanosheets, in embodiments. Such BRG is described in U.S. Patent Publication No. 2021/0061661, U.S. Patent Publication No. 2021/0238040, and U.S. Patent Publication No. 2019/0144280, which are incorporated herein by reference hereinabove.

As noted hereinabove, the cement slurry 50 can comprise from about 0.01 to about 20, from about 0.1 to about 15, from about 0.5 to about 5, or greater than or equal to about 0, 0.1, or 0.5 and less than or equal to about 20, 15, or 5 percent BRG by weight of cementitious material 30 (% BRG bwoc).

As noted above, in embodiments, the cementitious material 30 comprises a Portland cement, such as a Type I, IA, II, IIA, III, IIIA, IV, V, VI, or VII Portland cement, a subtype thereof, or a combination thereof. In embodiments, the cementitious material 30 comprises a construction grade (e.g., non-API) cement, wherein, as described hereinabove, a construction grade cement is a cement comprising greater than about 1 wt % calcium aluminate (C3A). As noted above, in embodiments, the cementitious material 30 comprises an API grade cement (e.g., API grade A, B, C, D, E, F, G, H, K, or L cement).

Placing the cement slurry 50 in the workspace at 220 can include adjusting a density of the cement slurry 50 during the placing of the cement slurry 50 in the workspace by adding supplemental water 20 to the cement slurry 50. Adjusting the density can comprise reducing the density of the cement slurry 50 being introduced into the workspace by at least 0.5, 1, or 3 pounds per gallon (PPG) by the addition of the supplemental water 20. Due to the presence of the graphene 10, the cement slurry 50 can remain stable, as evidenced by set slurry density test and free fluid testing according to API 10B-2. For example, minimal or no fallout (e.g., less than about 10, 9, 8, 7, 6, 5, 4, 3, 2, 1, or 0 wt % fallout) of graphene 10 and/or other components of the cement slurry 50 (e.g., cementitious material 30, cement additives, etc.) from the cement slurry 50 may be incurred by the addition of the supplemental water 20 into the cement slurry 50 to reduce the density thereof.

By way of non-limiting example, the exemplary cement slurries 50 disclosed herein may be employed in an oilwell workspace. For example, a cement slurry 50 can be deployed at the workspace via any methods known in the art and with the help of this disclosure. For example, cement slurry 50 can be introduced downhole via a cementing apparatus.

Figure 4:
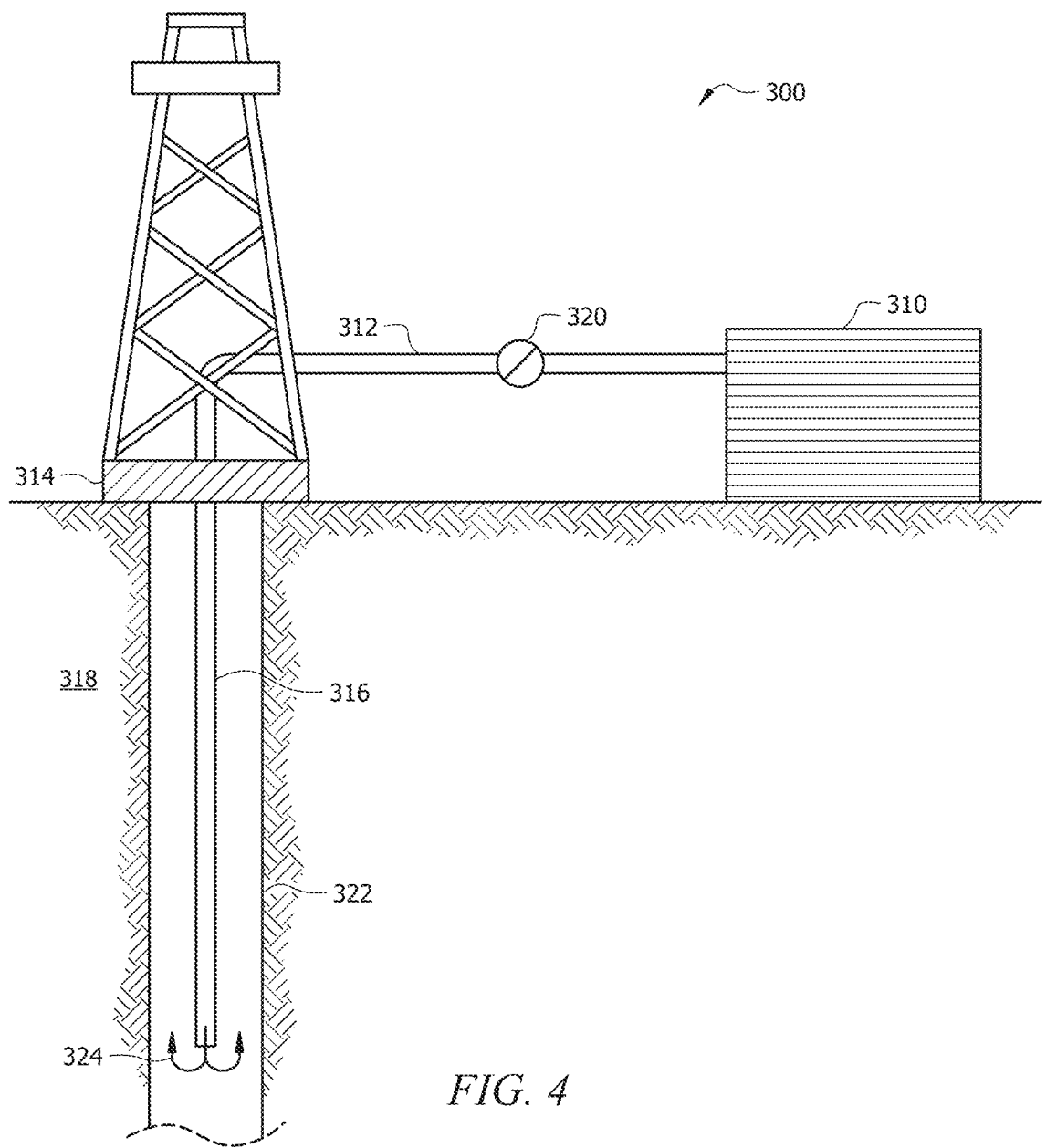
FIG. 4 is a schematic of a cementing workspace, according to embodiments of this disclosure.

FIG. 4 shows an illustrative schematic of cementing workspace or system 300 that can deliver cement slurry 50 of the present disclosure to a downhole location, according to one or more embodiments. It should be noted that while FIG. 4 generally depicts a land-based system, it is to be recognized that like systems may be operated in subsea locations as well. As depicted in FIG. 4, system 300 may include mixing tank 310, in which a cement slurry 50 of the present disclosure may be formulated. Again, in some embodiments, the mixing tank 310 may represent or otherwise be replaced with a transport vehicle or shipping container configured to deliver or otherwise convey the final cement slurry to the well site. The cement slurry 50 may be conveyed via line 312 to wellhead 314, where the cement slurry 50 enters tubular 316 (e.g., a casing, drill pipe, production tubing, coiled tubing, etc.), tubular 316 extending from wellhead 314 into wellbore 322 penetrating subterranean formation 318. Upon being ejected from tubular 316, the cement slurry 50 may subsequently return up the wellbore in the annulus between the tubular 316 and the wellbore 322 as indicated by flow lines 324. In other embodiments, the cement slurry 50 may be reverse pumped down through the annulus and up tubular 316 back to the surface, without departing from the scope of the disclosure. Pump 320 may be configured to raise the pressure of the cement slurry to a desired degree before its introduction into tubular 316 (or annalus). It is to be recognized that system 300 is merely exemplary in nature and various additional components may be present that have not necessarily been depicted in FIG. 4 in the interest of clarity. Non-limiting additional components that may be present include, but are not limited to, supply hoppers, valves, condensers, adapters, joints, ganges, sensors, compressors, pressure controllers, pressure sensors, flow rate controllers, flow rate sensors, temperature sensors, and the like. Moreover, reverse cementing, where the final cement slurry is directly placed in the annalus between the tubular 316 and the wellbore 322 may also be performed in accordance with the embodiments described herein, without departing from the present disclosure.

One skilled in the art, with the benefit of this disclosure, should recognize the changes to the system described in FIG. 4 to provide for other cementing operations squeeze operations, reverse cementing (where the cement is introduced into an annolus between a tubular and the wellbore and returns to the wellhead through the tubular), and the like.

It is also to be recognized that the disclosed cement slurries 50 may also directly or indirectly affect the various downbole equipment and tools that may come into contact with the final cement slurry during operation. Such equipment and tools may include, but are not limited, to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 4.

Upon setting, the hardened cement produced from cement slurry 50 can have a compressive strength, a tensile strength, a Young's modulus, a Poisson's ratio, or a combination thereof that is at least as high as (e.g., equal to or greater than) a compressive strength, a tensile strength, a Young's modulus, a Poisson's ratio, or a combination thereof of a hardened cement produced from a same cement slurry absent the graphene 10 (e.g., absent the BRG) and optionally comprising a different suspension aid.

In embodiments, graphene (e.g., BRG) can be utilized as a suspension aid in a cement slurry 50 of this disclosure, for example, as described in U.S. patent application Ser. No. 17/892,775 entitled, "Graphene Fluid Utilized to Suspend Particulates", the disclosure of which is hereby incorporated herein in its entirety for purposes not contrary to this disclosure; graphene (e.g., BRG) can be utilized as a cement retarder in a cement slurry 50 of this disclosure, for example, as described in U.S. patent application Ser. No. 17/892,781 entitled, "Graphene as a Cement Retarder", the disclosure of which is hereby incorporated herein in its entirety for purposes not contrary to this disclosure; and/or graphene (e.g., BRG) can be utilized to mitigate transient gels in a cement slurry 50 of this disclosure, for example, as described in U.S. patent application Ser. No. 17/892,787 entitled, "Mitigation of Transient Gels in Cement", the disclosure of which is hereby incorporated herein in its entirety for purposes not contrary to this disclosure.

As described herein, graphene can be utilized as a water extender, suspension aid, and/or in a variable density cement system. The disclosed systems and methods can be utilized to address settling, particle stability, and the ability to alter density on the fly by adding water when making cement slurries 50 as described herein. It has been unexpectedly discovered that the addition of graphene 10 (e.g., BRG) in concentrations from about 1 to 15% can be utilized to produce a highly thixotropic gel with a very fragile break.

Via this disclosure, graphene 10 can be utilized as a water extender and/or suspension aid. The graphene 10 can be utilized for cement slurries 50 at high temperatures, in embodiments, due to the thermal resilience of graphene 10. In embodiments, the system and method also allow for dilution of a cement slurry 50 (e.g., by up to 400% by volume of water or more) while maintaining thixotropic behavior and flowability under dynamic conditions. As a secondary, synergistic effect, utilizing graphene 10 as a suspending aid, as described herein, can provide for mechanical property enhancement of the resulting cement slurries 50, due to mechanical property modification provided by graphene 10.

The unique usage of graphene material, as described herein, can also incorporate the intrinsic properties of graphene 10, such as flexibility, electrical conductivity, etc., to the cement. The interesting thixotropic behavior of the resulting cement slurries 50 can, in embodiments, enable a wide range, water extendable cement slurry 50, enabling a wide range of (e.g., variable) cement slurry 50 densities from a single design across a wide (e.g., about 5 or more pounds per gallon (ppg)) density range.

The enhanced stability control provided by the cement slurries 50 of this disclosure can provide many advantages. For example, as noted hereinabove, the enhanced stability provided by the disclosed cement slurries 50 can serve to prevent settling and free water in the cement slurry. The enhanced stability control can enable formation of a cement barrier that is homogenous and thus hardens to provide a set cement having desired design properties (e.g., density, porosity, permeability, mechanical properties, etc.). By eliminating a need for a suspension aid, the enhanced stability of the disclosed cement slurries 50 can provide for a reduced cost of goods sold (COGS). In embodiments, the resulting set cements have one or more improved mechanical properties. In embodiments, use of the cement slurries 50 of this disclosure prevent or minimize the cost of poor quality (COPQ) due to reduced pump time from shut downs. That is, the disclosed cement slurries 50 may not settle when static, such as during a shutdown. The cement slurries 50 can provide for a reduced need for conventional suspending aids, such as bentonite, which conventional suspending aids can negatively contribute to mechanical property development of low-Portland cements. Accordingly, the cement slurries 50 can be utilized to provide hardened cements (e.g., low Portland cements) having one or more improved mechanical properties relative to cement slurries comprising conventional suspending aids.

Other advantages will be apparent to those of skill in the art and with the help of this disclosure.

EXAMPLES

The embodiments having been generally described, the following examples are given as particular examples to demonstrate the practice and advantages of this disclosure. It is understood that the examples are given by way of illustration and are not intended to limit the specification or the claims in any manner.

Example 1: Class H Cement

In order to formulate cement slurries 50 at various densities and graphene 10 content, several suspensions of graphene 10 in water (e.g., mix waters 40) were first prepared, as depicted in Table 1.

TABLE 1

Formulations of Mix Waters used in Graphene Slurries

| Name | Water (g) | Graphene (g) | Graphene (% bwow) |
|---|---|---|---|
| 15% bwow | 84.1 | 560.9 | 15.0 |
| 10% bwow | 51.3 | 513.0 | 10.0 |
| 5% bwow | 25.1 | 501.5 | 5.0 |

These three fluids of Table 1 were then used as the mix water 40 to form the graphene 10 containing cement slurries depicted in Table 2 below. All slurries were mixed following API procedures.

TABLE 2

Formulations, Free Fluid, and Density Values for Slurries 1-4

| Slurry # | Graphene (% bwoc) | Water (% bwoc) | Cement (% bwoc) | Calculated Density (ppg) | Free Fluid (%) |
|---|---|---|---|---|---|
| 1 (Comparative) | 0.0 | 126.1 | 100.0 | 12.0 | 60.0 |
| 2 | 7.4 | 148.5 | 100.0 | 12.0 | 7.0 |
| 3 | 17.1 | 171.1 | 100.0 | 11.5 | 0.0 |
| 4 | 38.4 | 255.8 | 100.0 | 10.5 | 0.0 |

Slurries 1-4 were then subjected to free fluid tests at room temperature and pressure while the graduated cylinders were vertically positioned. As can be seen in the table, the graphene 10 functioned as a suspending aid and/or water extender to allow the addition of more water 20 (less cement/cementitious material 30).

As summarized in Table 3 below, with the exception of adding suspending aid to Slurry 1, the same cement slurries were prepared and then poured into 2" by 4" gray cylinders. These cylinders were then cured in a water bath for 7 days at 140° F. and ambient pressure.

TABLE 3

Weight Percentages, Strength Test, and Density Values for Slurries 1-4

| Slurry # | Graphene (wt. %) | Water (wt. %) | Cement (wt. %) | Suspending Aid (wt. %) | Compressive Strength (psi) | Tensile Strength (psi) | Measured Density (ppg) |
|---|---|---|---|---|---|---|---|
| 1 | 0.0 | 55.7 | 44.2 | 0.15 | 290 | 46 | 12.4 |
| 2 | 2.9 | 58.0 | 39.1 | — | 373 | 124 | 12.1 |
| 3 | 5.9 | 59.4 | 34.7 | — | 188 | 52 | 11.4 |
| 4 | 9.7 | 64.9 | 25.4 | — | 47 | 18 | 10.7 |

After curing, samples of each were crushed on a Tinius-Olsen load frame for compressive strength determination and tested via the Brazilian tensile strength test procedure. The density of each sample slurry was measured via the Archimedes method. The obtained data shows, even though Slurry 2 had a slightly higher water content (and lower density) than Slurry 1, the set cement resulting therefrom exhibited much higher compressive and tensile strengths. Likewise, Slurry 3 had much lower cementitious material/cement 30 content and lower density than Slurry 1, but the set cement resulting therefrom exhibited similar compressive strength. Even though Slurry 4 was greatly water extended down to ~10.7 ppg, it still developed some compressive strength upon hardening/setting.

Additionally, to determine the ability of graphene 10 to maintain cement slurry 50 stability, the formulations in Table 3 were cured at the same conditions, and the 2" by 4" cylinders were cut into three equal sections. The sections were labeled Top, Middle, and Bottom. Each section was measured for density by the Archimedes method to obtain the values shown in Table 4.

TABLE 4

Stability of Set Slurries Measured with Archimedes Method

| Slurry # | Top (ppg) | Middle (ppg) | Bottom (ppg) | Average (ppg) | % Increase, Top to Bottom |
|---|---|---|---|---|---|
| 1 | 12.1 | 12.1 | 12.8 | 12.4 | 5.4 |
| 2 | 12.0 | 12.1 | 12.3 | 12.1 | 2.9 |
| 3 | 11.3 | 11.4 | 11.5 | 11.4 | 0.8 |
| 4 | 10.6 | 10.7 | 10.7 | 10.7 | 0.4 |

The values presented in Table 4 show that graphene 10 positively contributed to the stability of the cement slurries 50 of this disclosure.

ADDITIONAL DISCLOSURE

The following are non-limiting, specific embodiments in accordance with the present disclosure:

In a first embodiment, a cement slurry comprises: graphene, wherein the graphene comprises bioderived renewable graphene (BRG); a cementitious material; and water, wherein the cement slurry comprises from about 0.01 to about 20, from about 0.1 to about 15, from about 0.5 to about 5 percent graphene by weight of cementitious material (% graphene bwoc), and wherein the cement slurry, when unset, has enhanced stability, as evidenced by a uniform density of the slurry and a reduction in free fluid, according to API 10B-2, relative to a same cement slurry, when unset, absent the graphene.

A second embodiment can include the cement slurry of the first embodiment, wherein the BRG comprises graphene nanosheets.

A third embodiment can include the cement slurry of the second embodiment comprising greater than or equal to about 0, 0.1, or 0.5 and less than or equal to about 20, 15, or 5% BRG bwoc.

A fourth embodiment can include the cement slurry of the second or third embodiment, wherein the BRG comprises graphene derived from a plant.

A fifth embodiment can include the cement slurry of the fourth embodiment, wherein the plant comprises cassava.

A sixth embodiment can include the cement slurry of any one of the second to fifth embodiments, wherein the BRG comprises graphene with a fused sheet-like morphology.

A seventh embodiment can include the cement slurry of any one of the first to sixth embodiments, wherein the cementitious material comprises a Portland cement.

An eighth embodiment can include the cement slurry of the seventh embodiment, wherein the cementitious material comprises a Type I, IA, II, IIA, III, IIIA, IV, V, VI, or VII Portland cement, a sub-type thereof, or a combination thereof.

A ninth embodiment can include the cement slurry of any one of the first to eighth embodiments, wherein the cementitious material comprises an API grade cement.

In a tenth embodiment, a method of making a cement slurry comprises: combining graphene with water to provide a mix water, wherein the graphene comprises bioderived renewable graphene (BRG); combining the mix water with a cementitious material to provide the cement slurry; and placing the cement slurry in a workspace, wherein the cement slurry comprises from about 0.01 to about 20, from about 0.1 to about 15, from about 0.5 to about 5 percent graphene by weight of cementitious material (% graphene bwoc), and wherein the cement slurry has enhanced stability, as evidenced by a uniform density of the slurry and a reduction in free fluid, as measured according to API 10B-2, relative to a same cement slurry absent the graphene.

An eleventh embodiment can include the method of the tenth embodiment, wherein the cementitious material comprises a Portland cement.

A twelfth embodiment can include the method of the eleventh embodiment, wherein the cementitious material comprises a Type I, IA, II, IIA, III, IIIA, IV, V, VI, or VII Portland cement, a sub-type thereof, or a combination thereof.

A thirteenth embodiment can include the method of any one of the tenth to twelfth embodiments, wherein the cementitious material comprises an API grade cement.

A fourteenth embodiment can include the method of any one of the tenth to thirteenth embodiments, wherein the workspace comprise a wellbore penetrating a subterranean formation.

A fifteenth embodiment can include the method of the fourteenth embodiment, wherein the BRG is derived from a plant; for example, wherein the plant comprises cassava.

A sixteenth embodiment can include the method of the fifteenth embodiment, wherein the BRG comprises graphene with a fused sheet-like morphology.

In a seventeenth embodiment, a method comprises: providing a cement slurry comprising: graphene; a cementitious material; and water, wherein the graphene comprises bioderived renewable graphene (BRG) and wherein the cement slurry comprises from about 0.01 to about 20, from about 0.1 to about 15, from about 0.5 to about 5 percent graphene by weight of cementitious material (% graphene bwoc), and wherein the cement slurry has enhanced stability, as evidenced by a uniform density of the slurry and a reduction in free fluid, as measured according to API 10B-2, relative to a same cement slurry absent the graphene; placing the cement slurry in a workspace; and allowing the cement slurry to set to form a hardened cement.

An eighteenth embodiment can include the method of the seventeenth embodiment further comprising adjusting a density of the cement slurry during the placing of the cement slurry in the workspace by adding supplemental water to the cement slurry.

A nineteenth embodiment can include the method of the eighteenth embodiment, wherein adjusting the density comprises reducing the density by at least 0.5, 1, or 3 pounds per gallon (PPG) by the addition of the supplemental water, and wherein the cement slurry remains stable as evidenced by set slurry density test and free fluid testing according to API 10B-2.

A twentieth embodiment can include the method of any one of the seventeenth to nineteenth embodiments, wherein the hardened cement has a compressive strength, a tensile strength, or both a compressive strength and a tensile strength at least as high as a compressive strength, a tensile strength, or both a compressive strength and a tensile strength of a hardened cement produced from a same cement slurry absent the graphene and optionally comprising a different cement retarder.

A twenty first embodiment can include the method of any one of the seventeenth to twentieth embodiments, wherein the workspace comprises an oilwell workspace.

A twenty second embodiment can include the method of the twenty first embodiment, wherein the placing of the cement slurry is effected during a primary cementing operation.

A twenty third embodiment can include the method of any one of the seventeenth to twenty second embodiments, wherein the workspace comprises a non-oilwell workspace.

A twenty fourth embodiment can include the method of any one of the seventeenth to twenty third embodiments, wherein the cementitious material comprises a Portland cement.

A twenty fifth embodiment can include the method of the twenty fourth embodiment, wherein the cementitious material comprises a Type I, IA, II, IIA, III, IIIA, IV, V, VI, or VII Portland cement, a sub-type thereof, or a combination thereof.

A twenty sixth embodiment can include the method of any one of the seventeenth to twenty fifth embodiments, wherein the cementitious material comprises an API grade cement.

A twenty seventh embodiment can include the method of any one of the seventeenth to twenty sixth embodiments, wherein the BRG comprises graphene with a fused sheet-like morphology.

A twenty eighth embodiment can include the method of the twenty seventh embodiment, wherein the BRG is derived from a plant.

A twenty ninth embodiment can include the method of the twenty eighth embodiment, wherein the plant comprises cassava.

A thirtieth embodiment can include the method of any one of the twenty seventh to twenty ninth embodiments, wherein the BRG comprises graphene with a fused sheet-like morphology.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A cement slurry comprising:
   (1) a mixture comprising:
     (i) graphene, wherein the graphene comprises bioderived renewable graphene (BRG),
     (ii) a cementitious material, and
     (iii) water; and
   (2) up to 400% additional dilution water, wherein the cement slurry comprises from about 0.01 to about 20 percent graphene by weight of cementitious material (% graphene bwoc), and wherein the cement slurry, before and after dilution, has enhanced stability, as evidenced by a uniform density of the slurry and a reduction in free fluid, according to API 10B-2, relative to a same cement slurry absent the graphene.

2. The cement slurry of claim 1, wherein the BRG comprises graphene derived from a plant.

3. The cement slurry of claim 2, wherein the plant comprises cassava.

4. The cement slurry of claim 1, wherein the BRG comprises graphene with a fused sheet-like morphology.

5. The cement slurry of claim 1, wherein the cementitious material comprises a Portland cement.

6. The cement slurry of claim 1, wherein the cementitious material comprises an API grade cement.

7. The cement slurry of claim 1, wherein the BRG comprises graphene nanosheets.

8. The cement slurry of claim 1, comprising greater than or equal to about 0.5 and less than or equal to about 15% BRG bwoc.

9. The cement slurry of claim 1, wherein:
   (1) the BRG comprises nanosheets comprising greater than 90 weight percent carbon, and wherein the nanosheets have a surface area of at least 2000 $m^2/g$, a pore volume of at least 3 cc/g, or a combination thereof, or
   (2) the BRG is produced by:
   combining a renewable carbohydrate material with a dehydration solvent to aid hydrolysis;
   removing glycosidic linkages and water via chemical and/or thermal activation to provide an intermediate fused carbon material; and
   thermochemically activating the intermediate fused carbon material to exfoliate intercalated carbon layers of the intermediate fused carbon material and to initiate chemical bonding of carbon atoms to form the BRG, wherein the BRG comprises a network of sp2 bonded carbon nanosheets, or
   (3) both (1) and (2).

10. The cement slurry of claim 1, having a density of at least 5 pounds per gallon (ppg) less than the cement slurry design.

11. The cement slurry of claim 1, comprising no additional suspension aid.

12. A method comprising:
   providing a cement slurry comprising: graphene, a cementitious material, and water, wherein the graphene comprises bioderived renewable graphene (BRG) and wherein the cement slurry comprises from about 0.01 to about 20 percent graphene by weight of cementitious material (% graphene bwoc);
   adjusting a density of the cement slurry by adding supplemental water to the cement slurry to provide a diluted cement slurry;
   placing the diluted cement slurry in a workspace; and
   allowing the diluted cement slurry to set to form a hardened cement,
   wherein the cement slurry exhibits, before and after dilution, enhanced stability, as evidenced by a uniform density of the cement slurry and a reduction in free fluid, according to API 10B-2, relative to a same cement slurry absent the graphene.

13. The method of claim 12, comprising adjusting the density of the cement slurry during the placing of the cement slurry in the workspace by adding up to 400% supplemental water to the cement slurry.

14. The method of claim 12, wherein adjusting the density comprises reducing the density by at least 0.5 pounds per gallon (PPG) by the addition of the supplemental water, and wherein the diluted cement slurry remains stable as evidenced by set slurry density test and free fluid testing according to API 10B-2.

15. The method of claim 12, wherein the hardened cement has a compressive strength, a tensile strength, or both a compressive strength and a tensile strength at least as high as a compressive strength, a tensile strength, or both a compressive strength and a tensile strength of a hardened cement produced from a same cement slurry absent the graphene and optionally comprising a different cement retarder.

16. The method of claim 12, wherein the workspace comprises an oilwell workspace.

17. The method of claim 12, wherein the cementitious material comprises a cement selected from the group consisting of Type I, IA, II, IIA, III, IIIA, IV, V, VI, VII Portland cements, and combinations thereof.

18. The method of claim 12, wherein the cementitious material comprises an API grade cement.

19. The method of claim 12, wherein the BRG comprises graphene with a fused sheet-like morphology.

20. The method of claim 12, wherein the BRG comprises graphene derived from a plant.

* * * * *